United States Patent [19]

Champan et al.

[11] 4,066,846
[45] Jan. 3, 1978

[54] COMBINED ROTARY DIAL AND TOUCH-TONE TELEPHONE DECODING SYSTEM

[75] Inventors: Louis W. Champan, Kent; Arthur T. Perkins, Bellevue, both of Wash.

[73] Assignee: Melco, Bellevue, Wash.

[21] Appl. No.: 715,140

[22] Filed: Aug. 17, 1976

[51] Int. Cl.² .................................................. H04M 1/50
[52] U.S. Cl. ............................ 179/16 EC; 179/84 VF
[58] Field of Search ........... 179/16 AA, 16 EC, 16 R, 179/16 A, 16 EA, 18 EB, 18 FA, 7 R, 84 VF

[56] References Cited

U.S. PATENT DOCUMENTS

| | | | |
|---|---|---|---|
| 3,538,262 | 11/1970 | Gasser et al. | 179/16 EC |
| 3,851,110 | 11/1974 | Kelly et al. | 179/18 EB |
| 3,917,913 | 11/1975 | Patten | 179/16 EC |
| 3,941,937 | 3/1976 | Gauthier | 179/16 EA |
| 3,941,938 | 3/1976 | Gauthier | 179/18 EB |
| 4,013,838 | 3/1977 | Tsai | 179/16 EC |

Primary Examiner—Kathleen H. Claffy
Assistant Examiner—Randall P. Myers
Attorney, Agent, or Firm—Sherman Levy

[57] ABSTRACT

A rotary dial signal processing circuit and an automatic selecting circuit for combining the rotary dial signal processing circuit with a Touch-Tone digital decoding system. The rotary dial signal processing circuit includes means to interpret line signals as to on/off hook condition, dial pulsing, and completion of a dial pulse sequence. This includes estimation of the time durations of specific signal levels. Thus, for a dial pulse the off-hook signal input goes low for 33-90 ms, causing an appropriate system response; there is no system change for a low input signal of less than 25 ms; a low input signal of over 95 ms is interpreted as on-hook, and causes reset; a high input signal of over 150 ms is interpreted as completion of the dial sequence (timeout). The rotary dial signalling processing circuit counts the sensed dial pulses and provides a 4-bit output code which is compatible with the Touch-Tone code. This processing circuit also provides timing signals for the rotary dial/Touch-Tone interface and timeout logic. The rotary dial/Touch-Tone combining circuit buffers key timing outputs of the rotary dial signal processing circuit and renders them compatible with the Touch-Tone counterparts; it also establishes priority as to the rotary dial and Touch-Tone outputs. This circuit multiplexes the rotary dial and Touch-Tone timing signals and also multiplexes the rotary dial signal data and the Touch-Tone data into a common latch device for ultimate transmission to the associated transfer ready group or digit relay tree, as appropriate, and for generation of the ring timeout function.

18 Claims, 8 Drawing Figures

Rotary Dial RX Logic

COMBINED ROTARY DIAL AND TOUCH-TONE TELEPHONE DECODING SYSTEM

This invention relates to systems for decoding telephone dialing signals, and more particularly to number decoding systems for telephones of the rotary dial type, or telephone systems employing rotary dialing combined with Touch-Tone dialing.

A main object of the invention is to provide a novel and improved rotary dial number decoding circuit for telephones and means for effectively combining the rotary dial circuit with a Touch-Tone decoding system employed with the same telephones.

A further object of the invention is to provide an improved rotary dial signal processing circuit for telephones which efficiently interprets line signals as on/off hook, dial pulsing, and completion of a dial pulse sequence, the circuit including means for accurately estimating the time duration of the specific working signal levels, the circuit being arranged to distinguish between substantially short accidental or momentary input signals, legitimate dial signal pulses having a specific span of duration, long term signals representing completion of a dialing sequence, and signals representing an on-hook condition and thereby causing reset of circuit elements.

A still further object of the invention is to provide an improved rotary dial signal processing circuit for telephones which includes means for sensing input rotary dial pulses, means for counting the sensed dial pulses, and means for converting the sensed count into a 4-bit output code compatible with the 4-bit code of a Touch-Tone decoding system associated with the telephones, the improved circuit also providing timing signals for the combined rotary dial and Touch-Tone interface system and the timeout logic of the system.

A still further object of the invention is to provide an improved combined rotary dial and Touch-Tone signal processing circuit for telephones which includes a rotary dial signal processing section providing key timing outputs and means to render them compatible with counterparts in the associated Touch-Tone signal processing section and for establishing priority as to the rotary dial and Touch-Tone outputs.

A still further object of the invention is to provide an improved combined rotary dial and Touch-Tone signal processing circuit for telephones, the circuit being arranged to convert the rotary dial signals into digital form and render them compatible with corresponding Touch-Tone-derived digital-form signals, the improved circuit including means to multiplex rotary dial and Touch-Tone timing signals and to multiplex rotary dial-derived and Touch-Tone-derived digital data into the common data latch means for subsequent transmission to the associated transfer ready group or digit relay tree, as appropriate, and for generation of the ring timeout function.

Further objects and advantages of the invention will become apparent from the following description and claims, and from the accompanying drawings, wherein:

Figure 1:
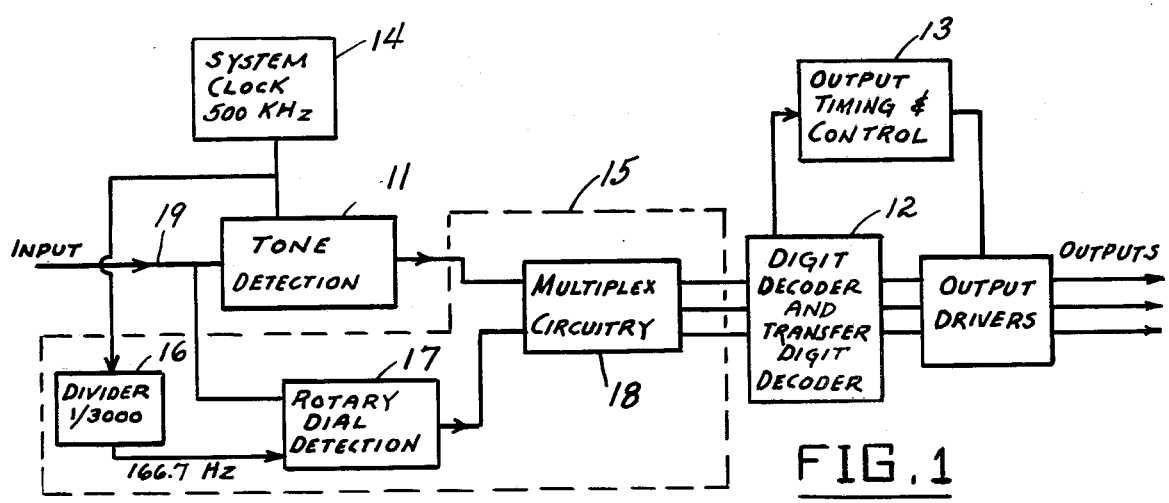
FIG. 1 is a block diagram of a typical combined rotary dial and Touch-Tone telephone number decoding system according to the present invention.

Reference is made to applicant's previously filed application Ser. No. 692,122 filed June 2, 1976, entitled "Digital Decoder for Multiple Frequency Telephone Signalling", now U.S. Pat. No. 4,044,206 on Aug. 23, 1977. This application discloses a multiple-frequency decoder (for use in a Touch-Tone dialing system) which measures the two-tone output from a multiple-frequency dial-type telephone and identifies what number was dialed, producing a unique binary code as a timed output for each number dialed. This system also has provision for detection and providing, as a separate output, a unique binary output word whenever a preselected transfer digit is dialed, so that with this additional output data transfer relays can be operated. The decoder inputs are derived from high and low pass filters. The decoder, which may be considered as included in the "Tone Detection" block 11 in FIG. 1, differentiates between valid multiple-frequency tones and extraneous noise, such as voice signals, completely digitally, as follows: once the digital measurement of one cycle of each of the multiple incoming frequencies is made, the combination of all frequency measurements is stored as a $k$-bit binary word. For a Touch-Tone decoding system involving two discrete frequencies, $k$ may be equal to 4. Updating of this $k$-bit word occurs at regular intervals synchronously with the receipt by the decoder of completion of the cycle of the final frequency to be measured, it being required that the same $k$-bit binary word occur $n$ consecutive times, for example, eight times, for the desired degree of noise immunity; each time another set of measurements is made it is compared with the previous measurement, which is the previous 4-bit binary word; if the previous and the new $k$-bit word equal each other eight consecutive times, then the output of latched storage devices, which may be considered as included in the "Digit Decoder and Transfer Digit Decoder" block 12 of FIG. 1, which have stored in them the unique $k$-bit binary word, corresponding to the Touch-Tone digit dialed, will be enabled to provide an output for a timed duration, by means as disclosed in said U.S. Pat. No. 4,044,206 provided in an "Output Timing and Control" block 13 in FIG. 1, after which all the latch devices will be reset. A 500 KHz system clock 14 (FIG. 1) is provided. For the disclosed Touch-Tone system, measurements of the incoming frequencies are referenced to the 500 KHz clock; the decoder counts the pulses of the 500 KHz clock over the interval of time represented by the period of the incoming frequency; when the count reaches a value representing a predetermined frequency edge, a decode gate recognizes this and allows an edge counter to increment one count; at the end of the interval the number of edges that have been decoded will be represented by the count which is in the edge counter.

The present invention contemplates the use of the same above-mentioned latched storage devices in a composite system containing rotary dialing means as well as Touch-Tone dialing means, with independent means similar to that disclosed in U.S. Pat. No. 4,044,206 for enabling the latched storage devices for the timed duration, and with means for distinguishing between Touch-Tone and rotary dialing in generating the binary number data and furnishing it to the latch devices, the output data from the enabled latch devices respectively for the Touch-Tone dialing and the rotary dialing being entirely compatible. The "latched storage devices" comprise the elements 19, 20 of U.S. Pat. No. 4,044,206, based on previously filed application Ser. No. 692,122. The "output timing and control means" of block 13 comprises the 1-shot devices I1 and I2 and associated operating elements as disclosed in said U.S. Pat. No. 4,044,206.

Thus, FIG. 1 substantially includes in the dotted enclosure 15 the elements employed in accordance with the present invention to form the above-mentioned composite system, employing the components disclosed in the above-identified previously filed application Ser. No. 692,122, now U.S. Pat. No. 4,044,206. The elements of the enclosure 15 comprise a frequency divider 16 receiving the output pulses of the system clock 14 and providing an output of 166.7 Hz (an independent 166.7 Hz pulse source may be employed), a "Rotary Dial Detection" section, generally designated at 17, and the multiplex circuitry for distinguishing between Touch-Tone and rotary dialing, generally designated at 18.

The Rotary Dial Detection section 17 is designed to interface with the off-hook signal provided at the input line, shown at 19, and to interpret logic state changes on this line, mainly to differentiate among three possible conditions: (1) on/off hook, (2) dial pulsing, and (3) the completion of a dial pulse sequence. The correct interpretation of the off-hook signal requires a capability on the part of the rotary dial RX logic of estimating the time duration of specific signal levels occurring on line 19 and appearing as signal CC in FIGS. 3 and 4. A first system requirement is that a dial pulse will be sensed if, and only if, the unbuffered off-hook input signal goes to the low state for at least 33 ms, but for no longer than 95 ms. Transitions to the low state occurring for less than 25 ms, as shown at 20 in FIG. 4, will be interpreted by the circuitry as contact bounce or noise, and will cause no system state changes. Transitions to the low state that extend without interruption for longer than 95 ms, as at 21 in FIG. 4, will be interpreted by the logic as an on-hook condition and will cause a reset signal to be generated to initialize the rotary dial and timeout circuitry. A logic high state that exists on the off-hook input line for longer than approximately 150 ms without interruption, as at 22 in FIG. 4, will be interpreted by the circuitry as the completion of a dial sequence (inter-digit timeout).

In addition to the off-hook interpretation function, the rotary dial RX logic counts the number of sensed dial pulses (in the signal DD in FIG. 4), to provide a 4-bit output code (compatible with the equivalent Touch-Tone code) that represents the digit dialed.

A further function of the rotary dial logic is to provide timing signals to the rotary dial/Touch-Tone interface logic and to the timeout logic.

The output of the divider 16 in FIG. 1, or an equivalent pulse generator, establishes the 166.7 Hz time base which is utilized by the rotary dial RX logic in distinguishing among off-hook, on-hook, valid dial pulse, and completion of dial sequence conditions.

As shown, the time base may be provided by using a divide-by-3000 counter 16 which is clocked from the 500 KHz Touch Tone system clock. An alternate implementation for providing the required 166.7 Hz clock pulses could comprise a stable multivibrator whose frequency is controlled by suitable resistive and capacitive components. One clock pulse would have a period of 6 ms.

Figure 2:
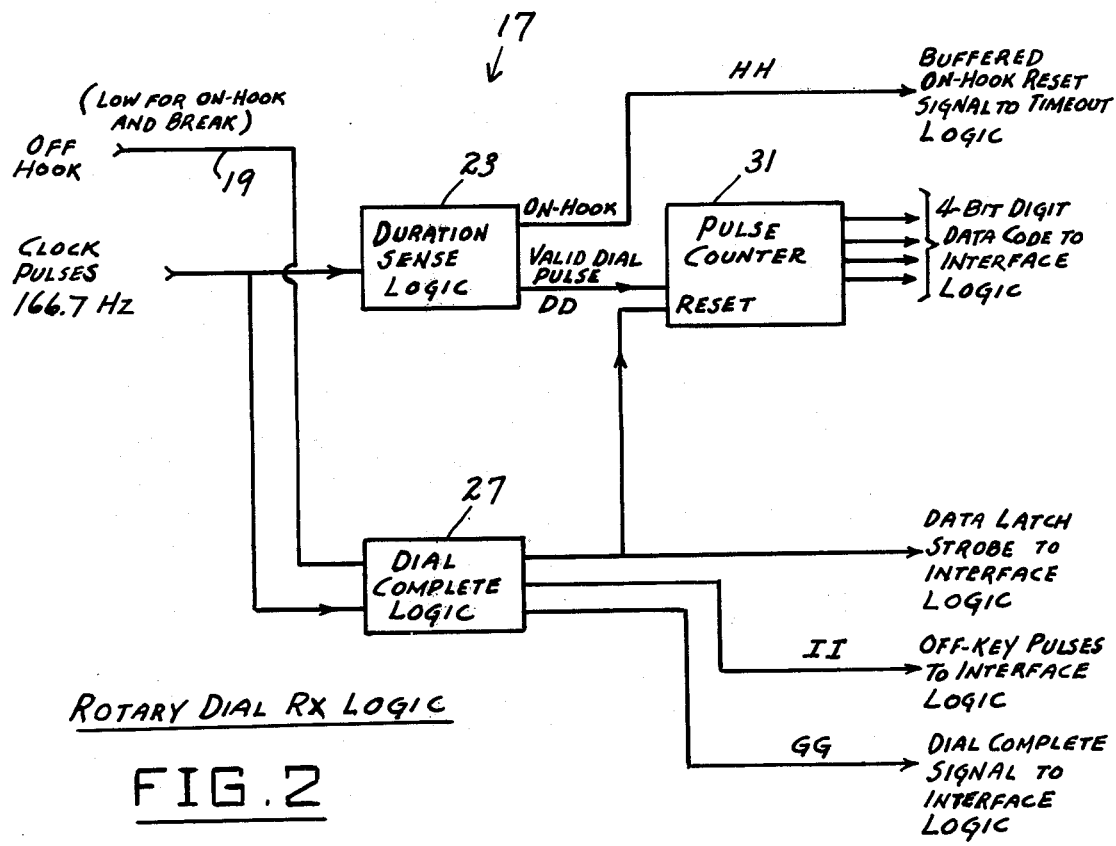
FIG. 2 is a block diagram of the improved rotary dial signal processing section of the combined system shown in FIG. 1.
Figure 3:
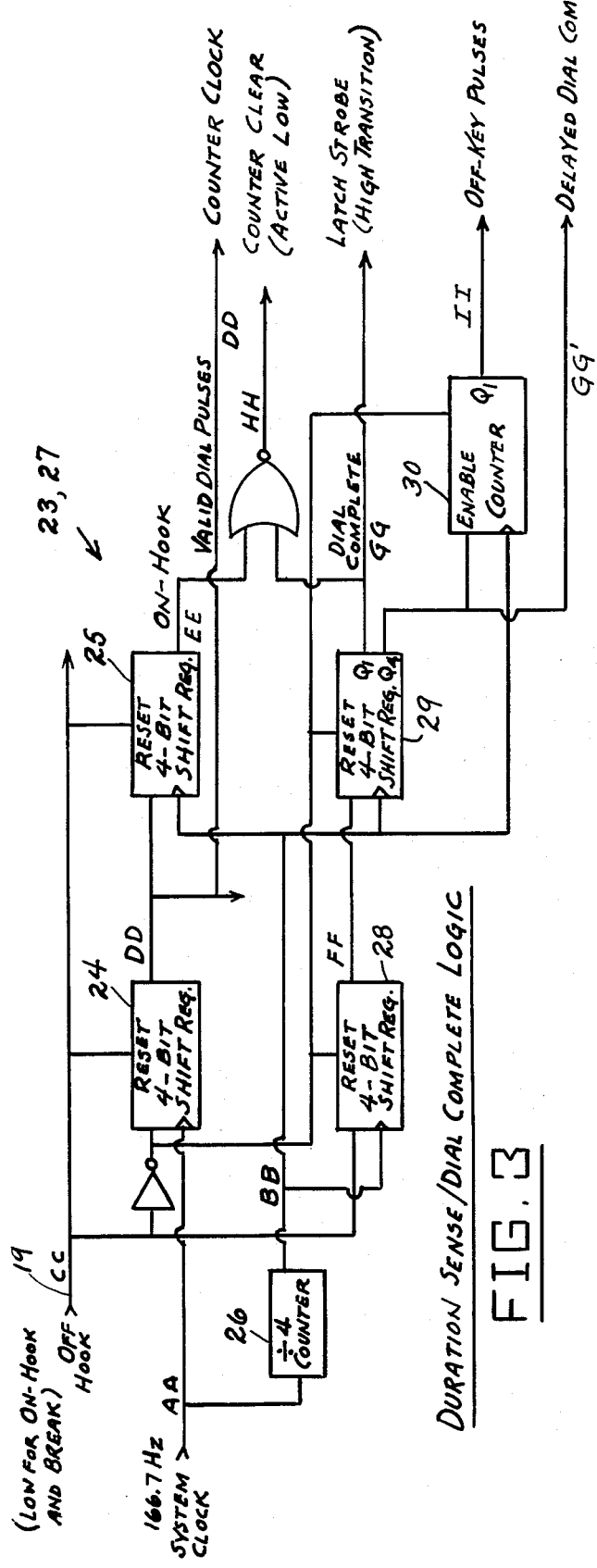
FIG. 3 is a circuit diagram of the rotary dial signal sensing portion of the rotary dial signal processing section of FIG. 2.
Figure 4:
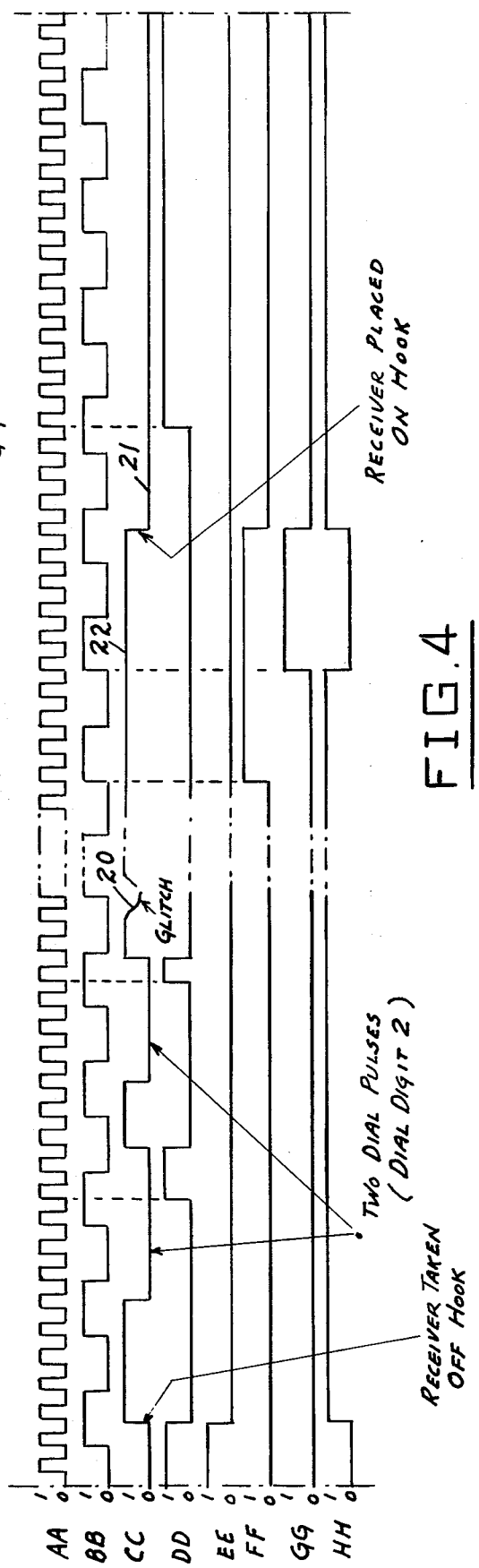
FIG. 4 is a graph showing various signal wave forms and their timing relationships, as derived from the circuit of FIG. 3 in response to rotary dial input signals.

Referring to FIGS. 2 and 3, the "Duration Sense Logic" block, shown at 23, is implemented in FIG. 3 by two 4-bit shift registers 24 and 25, the shift register 24 being clocked directly from the 166.7 Hz system clock source, and the shift register 25 being clocked at a slower rate through a divide-by-four counter 26. The outputs of the "Duration Sense Logic" are shown as signals DD and EE. As shown on the associated timing diagram (FIG. 4), signal DD will become true whenever the off-hook signal CC remains low for longer than approximately 25 ms (more than four 6 ms clock pulse periods). If the off-hook signal CC continues to be low for longer than approximately 95 ms, signal EE will also become true, providing a sensed on-hook condition. If at any time the off-hook signal CC becomes high, the shift registers 24, 25 associated with signals DD and EE will be reset immediately, thus providing system immunity from contact bounce and spurious pulses on the off-hook line.

The "Dial Complete Logic," shown as block 27 of FIG. 2, consists of two shift registers 28 and 29 (associated with signals FF and GG of FIG. 3), and an integrating counter 30. As shown on the timing diagram of FIG. 4, the shift registers 28, 29 operate on essentially the opposite conditions from those of shift registers 24, 25 associated with the "Duration Sense Logic" 23. The two 4-bit shift registers 28, 29 are wired to form an 8-bit register with signal GG as the primary output. Signal GG will become true if the off-hook signal CC remains true for a duration sufficient to represent the completion of dialing. The register 29 provides an output signal GG' delayed relative to the "dial complete" output signal GG, and this is employed with the counter 30 to generate off-key pulses I2, compatible with the Touch-Tone system, for delivery to the rotary dial/Touch-Tone interface logic.

Figures 5, 6:
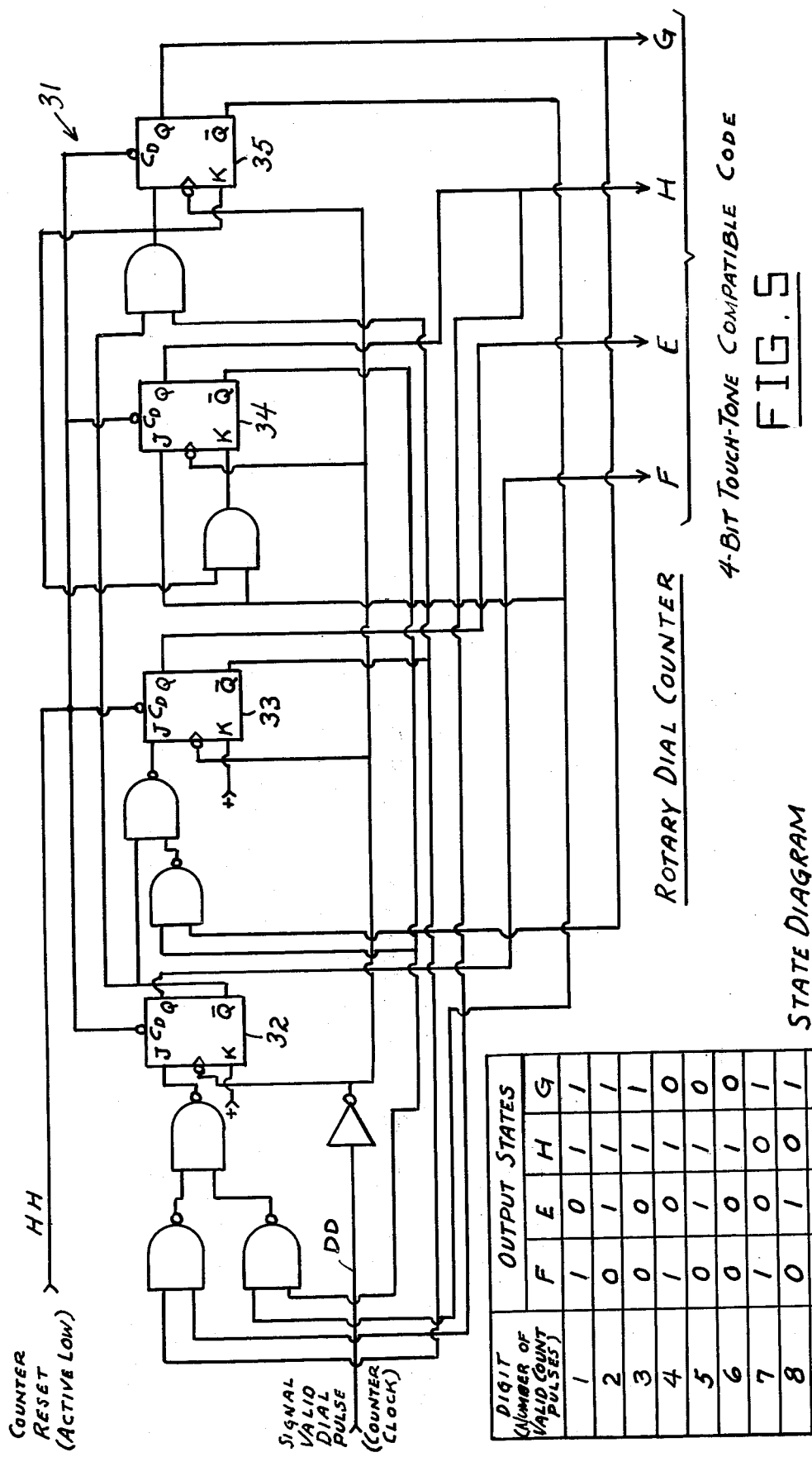
FIG. 5 is a wiring diagram of the rotary dial pulse counter employed in FIG. 2.
FIG. 6 is a chart showing a specific coding sequence or state diagram selected for compatibility of the rotary dial-derived digital data with an associated Touch-Tone output code.

The pulse counter 31, shown in FIGS. 2 and 5, is a four-stage counter which increments each time a leading edge of the "valid dial pulse" signal DD is received from the duration sense logic 23. The counter 31 comprises four J-K flip-flops 32 to 35 and the accompanying gating structure shown in FIG. 5, to provide the count sequence shown in FIG. 6. The specific sequence shown in FIG. 6 was selected for compatibility with the Touch-Tone output code. Thus, the off-hook signal is interpreted and there is generated a digital word F, E, H, G which is compatible with the Touch-Tone output code.

Figure 7:
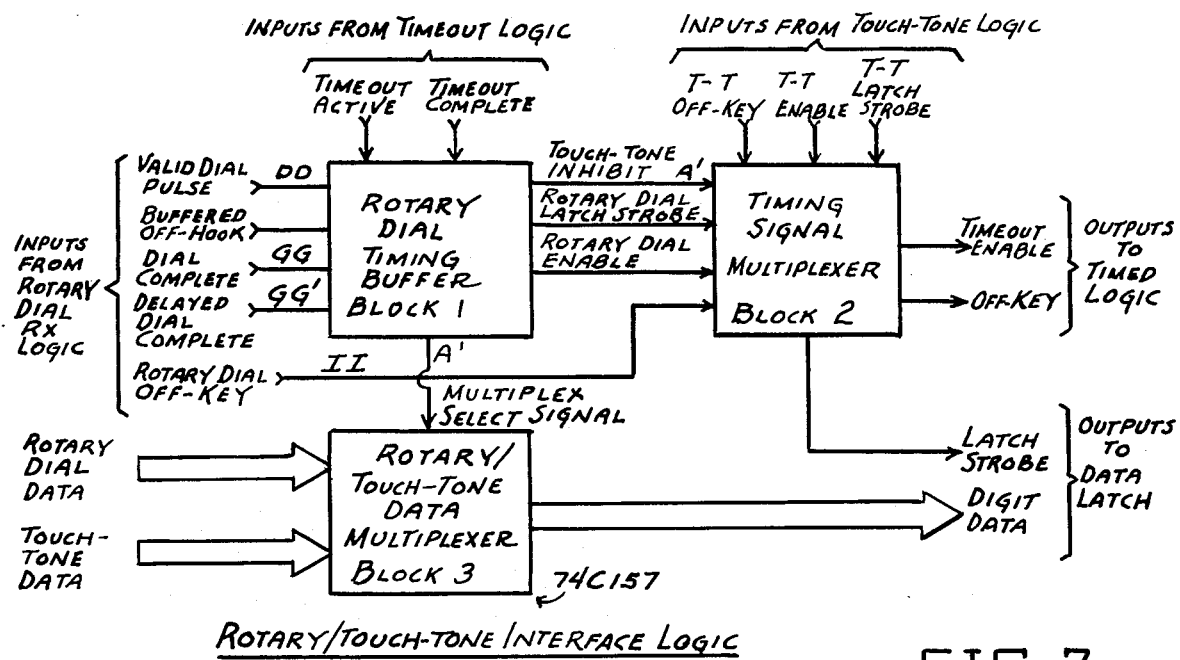
FIG. 7 is a block diagram showing the rotary dial/Touch-Tone interface logic broadly illustrated in FIG. 1.
Figure 8:
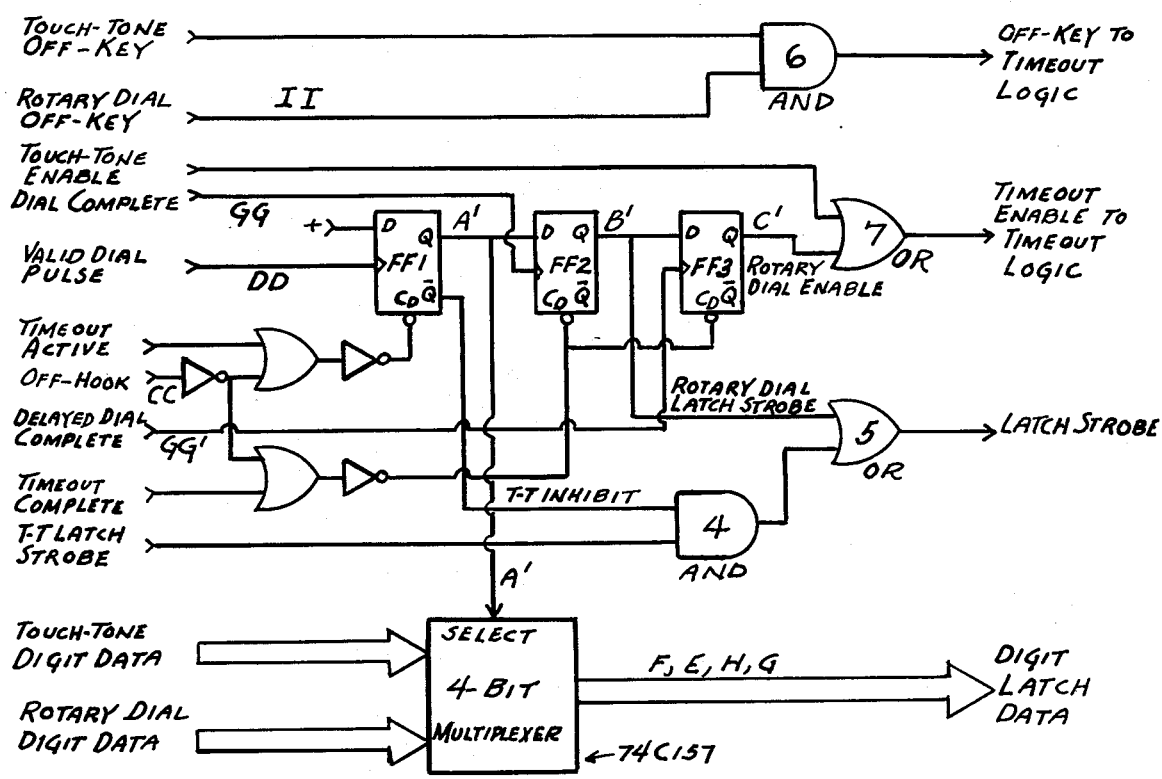
FIG. 8 is a wiring diagram of a typical embodiment of the rotary dial/Touch-Tone interface logic shown in FIG. 7.

Referring to FIGS. 7 and 8, the Rotary/Touch-Tone interface logic is illustrated in these Figures and is designed to accomplish three functions:

1. It buffers key timing outputs from the Rotary Dial RX Logic (FIG. 2) to render the signals compatible or identical in form to their counterparts from the Touch-Tone RX Logic (Block 1 of FIG. 7). The timing buffer also establishes priority among the Rotary and Touch-Tone outputs.

2. It multiplexes the Touch-Tone and Rotary Dial timing signals (Block 2 of FIG. 7).

3. It multiplexes data from the Rotary and Touch-Tone receivers into a common latch (Block 3 of FIG. 7).

Referring to FIG. 8, signals A', B' and C' comprise the outputs of the Rotary Dial Timing Buffer (Block 1 of FIG. 7), and are generated by flip-flops FF1, FF2 and FF3 and their associated gating, as shown in FIG. 8. Signal A' will go true whenever a valid dial pulse (signal DD) is received from the Rotary Dial RX Logic (FIG. 3). Signal A' feeds directly into Blocks 2 and 3 of FIG. 7, causing the Rotary Dial signals to override the Touch-Tone signals by inhibiting the Touch-Tone latch strobe and setting the data multiplexer to select the Rotary Dial data. Signal A' establishes the following priority:

Normally, signal A' is low, setting the system to accept Touch-Tone rather than Rotary Dial signals; however, when a valid pulse is detected within the Rotary Dial RX Logic (in signal DD), signal A' will go true, enabling the Rotary Dial outputs and thus temporarily establishing precedence of the Rotary Dial Logic over the Touch-Tone Logic.

The priority scheme described above is necessitated by the fact that the Rotary Dial timing signals are non-repetitive and must be captured as they occur.

Once the Rotary Dial timing signals have accomplished the function of enabling the time-out logic, signal A' will be reset, allowing the system priority to revert back to Touch-Tone. Signal A' has an additional function besides establishing Rotary/Touch-Tone priority; when true, this signal serves to enable flip-flop FF2, the output of which is signal B'. Signal B' will thus go true only if signal A' remains true until the time that flip-flop FF2 is clocked by the "dial complete" signal GG.

It is possible for the Rotary Dial RX Logic to generate a spurious valid dial pulse signal in the process of sensing an on-hook condition, thus setting signal A' true; in this case, however, the off-hook signal CC will go false, clearing flip-flop FF1 prior to the generation of a dial complete signal (GG) and thus ensuring that the spurious "valid" dial pulse signal will not affect system operation.

As above noted, signal B' will be set true at the positive transition of the dial complete signal GG, prior to which valid dial pulses (DD) have set signal A' true and have incremented the Rotary Dial counter 31 to the proper state. The positive transition of signal B' will then strobe the counter output into the external data latch (via gate 5). Provided that signal B' has been set true, signal C' will be set by signal GG' after a delay sufficient to ensure that the latch output data has already operated the appropriate relays. Signal C', when true, will then serve via gate 7 to enable the time-out logic.

The timing multiplexer (Block 2 of FIG. 7) consists of gates 4 to 7 of FIG. 8. Gate 4 inhibits the Touch-Tone latch signal during Rotary Dial operation; gate 5 permits either the Rotary Dial or the Touch-Tone strobe, when enabled, to clock data into the external latch; gate 6 provides off-key pulses only if an off-key condition exists for both Rotary Dial and Touch-Tone sections; gate 7 permits enabling of the time-out logic from either the Rotary Dial or the Touch-Tone enable signal.

The data multiplexer (Block 3 of FIG. 7) consists of a quad two-input data selector (Type 74C157 or equivalent) providing a four-bit output word identical to the four-bit Rotary Dial input word when the select line (signal A') is high, and identical to the four-bit Touch-Tone input word when the select signal A' is low.

While a specific embodiment of an improved rotary dial signal processing circuit and an automatic selecting circuit for combining the rotary dial signal processing circuit with a Touch-Tone digital decoding system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a telephone dialing system, an input line subject to voltage level changes including on-hook, dial pulsing, and completion of a dial pulse sequence, means to differentiate among said voltage level changes comprising a source of clock pulses, means to interpret the voltage level changes in terms of the number of clock pulses by counting the clock pulses in the respective changes and to generate output logic signals indicative of on-hook, off-hook, dial pulses and completion of a dial pulse sequence, and including means to sense a dial pulse when the off-hook signal in the input line goes low for at least a predetermined lower threshold time and no longer than a predetermined upper threshold time, according to the count of said clock pulses, and means to generate an output code of binary signals in accordance with the number of sensed dial pulses, said output code representing the digit dialed.

2. The telephone dialing system of claim 1, and wherein said lower threshold time is approximately 33 ms and said upper threshold time is approximately 95 ms.

3. The telephone dialing system of claim 1, and wherein the means to sense when the off-hook signal goes low for said predetermined lower threshold time comprises a shift register whose input is connected to said input line, and means to clock said shift register by said source of clock pulses, said shift register being constructed so as to fill up upon receipt of a number of clock pulses corresponding to said lower threshold time and then provide an output representing a valid dial pulse.

4. The telephone dialing system of claim 3, and wherein the means to sense when the off-hook signal goes low for said predetermined upper threshold time comprises a second shift register whose input is connected to the output of said first-named shift register, and means to clock said second shift register at a fraction of the rate of said clock pulses, said second shift register being constructed so as to fill up upon receipt of a number of clock pulses at the fractional rate corresponding to said upper threshold time and then provide an output representing an on-hook condition.

5. The telephone dialing system of claim 4, and means to reset said first-mentioned and second shift registers whenever the off-hook signal in the input line goes high, whereby to provide system immunity from spurious pulses in the input line.

6. The telephone dialing system of claim 4, including means to sense completion of a dial pulse sequence comprising additional shift register means having an input connected to said input line, and means to clock said additional shift register means at said fraction of the rate of said clock pulses, said additional shift register means being constructed to provide a true output signal when the off-hook signal of the input line remains high for a duration sufficient to represent the completion of dialing.

7. The telephone dialing system of claim 6, and wherein said additional shift register means comprises two 4-bit shift registers wired to form an 8-bit register, with the dial completion signal as its primary output.

8. The telephone dialing system of claim 6, and wherein said additional shift register means includes means to provide a further output signal delayed relative to said dialing completion true output signal, counter means to generate off-key pulses, means to clock said counter means at said fractional rate of clock pulses, and means to enable said counter means with said delayed further output signal from said additional shift register means.

9. The telephone dialing system of claim 6, and wherein said means to generate said output code of binary signals comprises a multi-stage counter, means to connect the valid dial pulse output of said first-named shift register to the input of said multi-stage counter means, a plurality of respective output terminals for the binary signals, and circuit means connecting the outputs of the respective stages of said multi-stage counter to said output terminals.

10. The telephone dialing system of claim 9, and wherein said multi-stage counter has four stages, whereby to generate a four-bit binary code word at said output terminals, representing the dialed digit.

11. In a telephone dialing system, an input line adapted to receive Touch-Tone dialing signals and rotary dialing signals, Touch-Tone decoding means connected to said input line and comprising means to derive binary code words representing Touch-Tone frequencies corresponding to Touch-Tone dialed numbers, latched storage means to receive and store the binary code words, means responsive to rotary dial pulses in said input line to generate an output code of binary signals compatible with said first-named binary code words, said output code representing a rotary dialed digit, and means to selectively connect said rotary dialed digit output code generating means and said Touch-Tone decoding means to said latched storage means in accordance with the presence or absence of rotary dial pulses in said input line, wherein said selective connecting means comprises multiplex circuit means normally connecting said Touch-Tone decoding means to said latched storage means, and means to disconnect said Touch-Tone decoding means from said latched storage means and connect said rotary dialed digit output code generating means to said latched storage means responsive to the presence of a valid rotary dialed pulse in said input line.

12. The telephone dialing system of claim 11, and wherein the dialing system includes output timing means to reset the latched storage means, and means responsive to valid rotary dial pulses in said input line to enable said output timing means.

13. In a telephone dialing system, an input line adapted to receive Touch-Tone dialing signals and rotary dialing signals, Touch-Tone decoding means connected to said input line and comprising means to derive binary code words representing Touch-Tone frequencies corresponding to Touch-Tone dialed numbers, latched storage means to receive and store the binary code words, said input line being subject to voltage level changes including on-hook, off-hook, dial pulsing, and completion of a dial sequence, means to differentiate among said voltage level changes comprising a source of clock pulses, means to interpret the voltage level changes in terms of the number of clock pulses by counting the clock pulses in the respective changes and including means to sense a valid dial pulse when the off-hook signal in the input line goes low for at least a predetermined lower threshold time and no longer than a predetermined upper threshold time, according to the count of the clock pulses, means to generate an output code of binary signals compatible with said first-named binary code words, according to the count of said clock pulses, said output code representing a rotary dialed digit, and means to selectively connect said rotary dialed digit output code generating means and said Touch-Tone decoding means to said latched storage means in accordance with the sensing of a valid rotary dial pulse.

14. The telephone dialing system of claim 13, and wherein said selective connecting means includes means to connect said Touch-Tone decoding means to said latched storage means in the absence of a valid rotary dial pulse.

15. The telephone dialing system of claim 14, and buffering flip-flop means operatively connected between said valid pulse sensing means and said selective connecting means.

16. The telephone dialing system of claim 14, and wherein the dialing system includes output timing means to reset the latched storage means, and means including buffering flip-flop means responsive to valid rotary dial pulses in said input line to enable said output timing means.

17. The telephone dialing system of claim 16, and wherein the output of said flip-flop means is normally low, and means to enable said output timing means for Touch-Tone signals rather than rotary dial signals when said output is low.

18. The telephone dialing system of claim 16, and wherein the dialing system includes output timing means to reset the latched storage means and includes timing multiplex means comprising a first gate wired to inhibit the Touch-Tone latch signal during rotary dial operation, a second gate wired to permit either rotary dial strobe from said flip-flop means or Touch-Tone strobe when enabled, to clock data into the latched storage means, a third gate wired to provide off-key pulses to said output timing means only if an off-key condition exists for both the rotary dial and Touch-Tone circuit sections, and a fourth gate wired to permit enabling of the output timing means from either said buffering flip-flop means or the Touch-Tone circuit section.

* * * * *